(12) United States Patent
Clothier (10) Patent No.: US 11,346,387 B2
(45) Date of Patent: May 31, 2022

(54) INTEGRAL SEALANT O-RING

(71) Applicant: Textron Aviation Inc., Wichita, KS (US)

(72) Inventor: Brent Clothier, Wichita, KS (US)

(73) Assignee: Textron Innovations, Inc., Providence, RI (US)

(*) Notice: Subject to any disclaimer, the term of this patent is extended or adjusted under 35 U.S.C. 154(b) by 283 days.

(21) Appl. No.: 16/379,974

(22) Filed: Apr. 10, 2019

(65) Prior Publication Data
US 2019/0323539 A1    Oct. 24, 2019

Related U.S. Application Data

(60) Provisional application No. 62/659,360, filed on Apr. 18, 2018.

(51) Int. Cl.
*F16B 33/00* (2006.01)
*B64C 3/34* (2006.01)
*F16B 5/02* (2006.01)

(52) U.S. Cl.
CPC ............. *F16B 33/004* (2013.01); *B64C 3/34* (2013.01); *F16B 5/02* (2013.01)

(58) Field of Classification Search
CPC .... F16B 33/004; F16B 2013/006; F16B 5/02; F16B 17/008; F16J 15/022; B64C 3/34
See application file for complete search history.

(56) References Cited

U.S. PATENT DOCUMENTS

| | | | | |
|---|---|---|---|---|
| 2,884,098 A | * | 4/1959 | Hutchison | F16B 43/001 403/288 |
| 2,986,244 A | * | 5/1961 | Hutchison | F16B 33/004 220/693 |
| 3,247,752 A | * | 4/1966 | Greenleaf | F16B 43/001 411/542 |
| 6,048,150 A | * | 4/2000 | Clarke | F16B 35/048 411/187 |
| 6,083,604 A | * | 7/2000 | Haraga | F16B 5/00 428/132 |
| 9,701,388 B2 | * | 7/2017 | Busby | B64C 1/00 |
| 9,803,674 B2 | * | 10/2017 | Busby | B32B 15/095 |

(Continued)

FOREIGN PATENT DOCUMENTS

| | | | | |
|---|---|---|---|---|
| JP | 08121442 A | * | 5/1996 | ............ F16B 17/008 |
| JP | 2009083640 A | * | 4/2009 | ............ F16B 33/004 |
| JP | 2010254287 A | * | 11/2010 | ............ F16B 37/14 |

*Primary Examiner* — Eugene G Byrd
(74) *Attorney, Agent, or Firm* — Erise IP, P.A.

(57) ABSTRACT

An integral sealant O-ring for sealing fasteners in mating surfaces of a fuel tank includes a fastener hole through an inner mating surface and an outer mating surface, the fastener hole has a chamfer along a fay interface between the mating surfaces. A layer of sealant is applied along the fay interface, and upon tightening of the fastener, the inner and outer mating surfaces are pulled together squeezing the sealant into the chamfer and forming an integral sealant O-ring around the fastener. A method of forming an integral sealant O-ring includes forming a chamfer in a first mating surface substantially concentric with a fastener hole, applying a layer of sealant along the first mating surface, pulling together the first mating surface with a second mating surface by tightening a fastener to trap sealant within the chamfer for forming an integral sealant O-ring.

16 Claims, 6 Drawing Sheets

(56) References Cited

U.S. PATENT DOCUMENTS

| | | | | |
|---|---|---|---|---|
| 2002/0054807 A1* | 5/2002 | Hartmann | | F16B 41/002 411/353 |
| 2009/0202294 A1* | 8/2009 | Apfel | | F16B 5/04 403/267 |
| 2010/0221064 A1* | 9/2010 | West | | F16J 15/14 403/288 |
| 2012/0160960 A1* | 6/2012 | Satake | | F16B 33/004 244/1 A |
| 2013/0330145 A1* | 12/2013 | Cloud | | F16B 25/0015 411/82 |
| 2014/0238334 A1* | 8/2014 | Griffiths | | F16B 13/04 123/196 CP |
| 2014/0334868 A1* | 11/2014 | Apfel | | C08K 3/10 403/267 |
| 2014/0338179 A1* | 11/2014 | Whitlock | | F16B 33/004 29/525.02 |
| 2014/0373359 A1* | 12/2014 | Schomaker | | B64D 45/02 29/897.2 |
| 2015/0219140 A1* | 8/2015 | Jenning | | F16B 33/004 411/82 |
| 2016/0312820 A1* | 10/2016 | Lor | | F16B 5/02 |
| 2017/0086317 A1* | 3/2017 | Pelletier | | H05K 5/0213 |
| 2017/0284563 A1* | 10/2017 | Lou | | F16B 33/004 |

* cited by examiner

INTEGRAL SEALANT O-RING

CROSS-REFERENCE TO RELATED APPLICATIONS

This application claims the benefit of U.S. Provisional Patent Application Ser. No. 62/659,360, entitled Integral Sealant O-Ring and filed Apr. 18, 2018, the disclosure of which is herein incorporated by reference in its entirety.

BACKGROUND

1. Field of the Disclosure

Embodiments of this disclosure relate generally to sealing fasteners, and more specifically to sealing fasteners associated with aircraft fuel tanks for preventing fuel leaks.

2. Description of the Related Art

None.

SUMMARY

In an embodiment, an integral sealant O-ring for sealing fasteners in mating surfaces of a fuel tank is provided. An inner mating surface has an inner hole for receiving a fastener. An outer mating surface has an outer hole for receiving the fastener with the outer hole being aligned with the inner hole. The fastener has a shank portion aligned through the inner hole and the outer hole and a head portion protruding adjacent the inner mating surface for tightening the fastener. A chamfer is provided around one of the inner hole or the outer hole along a fay interface between the inner mating surface and the outer mating surface. A layer of sealant is applied along the fay interface. The integral sealant O-ring is formed in the chamfer by the layer of sealant upon tightening of the fastener.

In another embodiment, a fastener seal for sealing fasteners in mating surfaces of a fuel tank is provided. An inner mating surface has an inner hole for receiving a fastener. An outer mating surface has an outer hole for receiving the fastener with the outer hole being aligned with the inner hole. The fastener has a shank portion aligned through the inner hole and the outer hole and a head portion protruding adjacent the inner mating surface for tightening the fastener. A first chamfer is provided in the outer mating surface and is adapted for receiving a tapered end of the fastener. A second chamfer, concentric with the first chamfer, has a narrower cone angle than that of the first chamfer such that a radial channel is formed around a portion of the shank and a portion of the tapered end. A layer of sealant is applied along the second chamfer such that an integral sealant O-ring is formed in the radial channel.

In yet another embodiment, a method of forming an integral sealant O-ring for sealing fasteners of mating surfaces of a fuel tank is provided. The method includes forming a chamfer in a first mating surface substantially concentric with a first hole, the first hole adapted for receiving a fastener through the first mating surface; applying a layer of sealant along the first mating surface; and arranging a second mating surface substantially in parallel with the first mating surface. The second mating surface has a second hole aligned with the first hole. The method further includes inserting the fastener through the first hole and the second hole; pulling together the first mating surface with the second mating surface by tightening the fastener, which traps a portion of the sealant within the chamfer for forming an integral sealant O-ring around a shank portion of the fastener.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

For aircraft fuel tanks that have a "wet wing" configuration, meaning that no bladder is used to contain fuel within the wing, special means are needed to prevent leaking of fuel especially along fasteners of the fuel-tank/wing surfaces. Standard practice for sealing fuel-tank fasteners is to apply a fay and fillet seal to mating surfaces of the wing structure and a daub seal to a wet end of each fastener protruding into the fuel tank.

Figure 1:
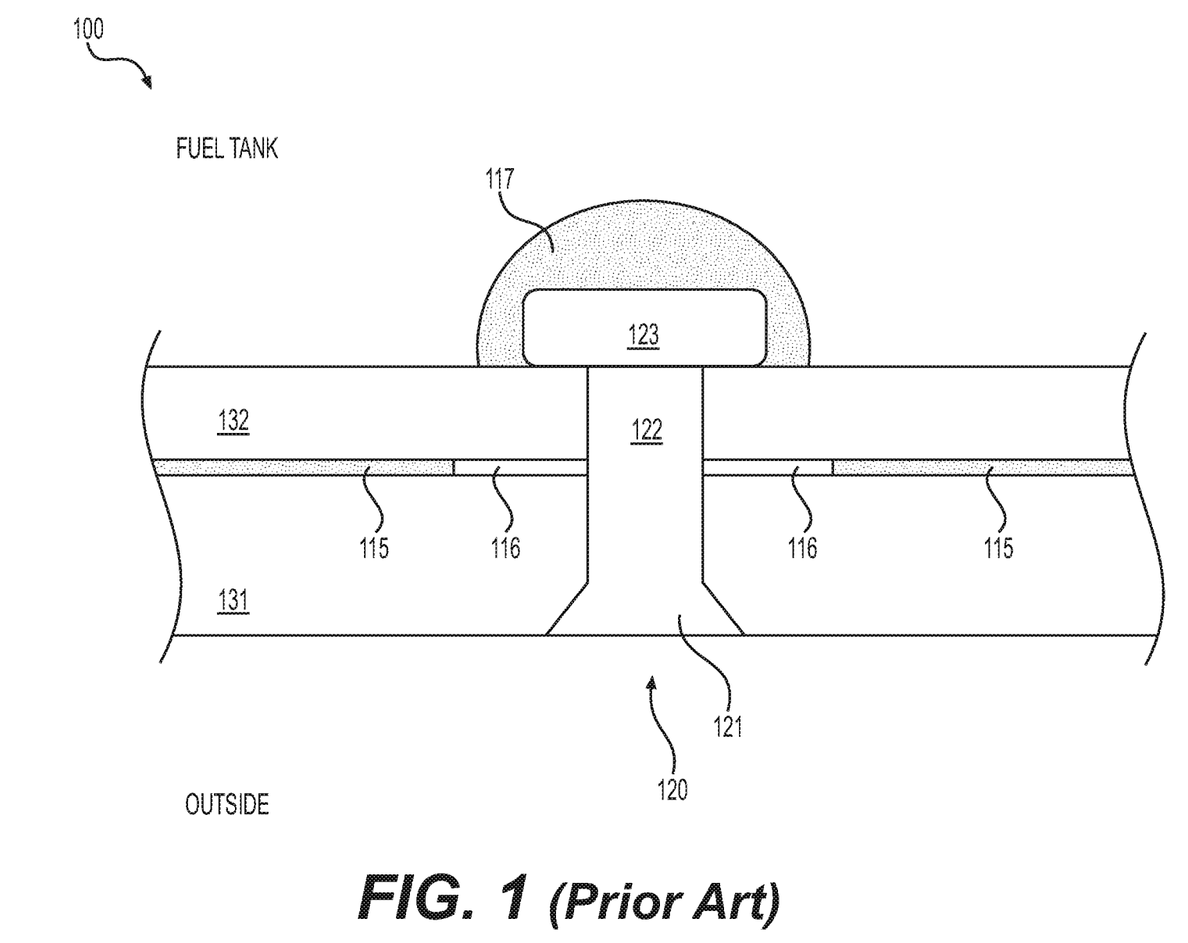
FIG. 1 is a cross-sectional side view of a prior art aircraft-wing fuel-tank fastener installation.
Figure 2:
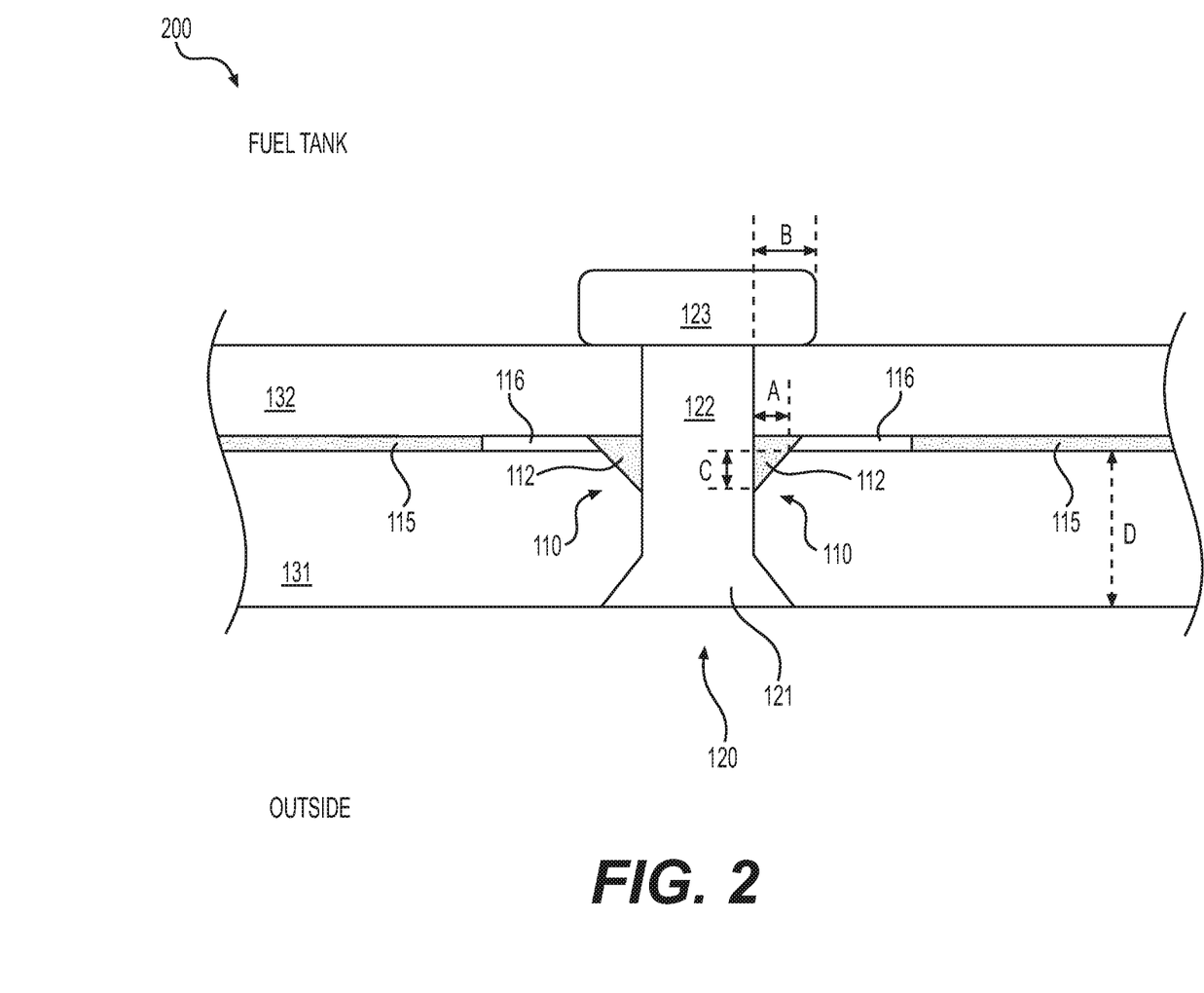
FIG. 2 is a cross-sectional side view of an aircraft-wing fuel-tank fastener installation having an integral sealant O-ring, in an embodiment.
Figure 3:
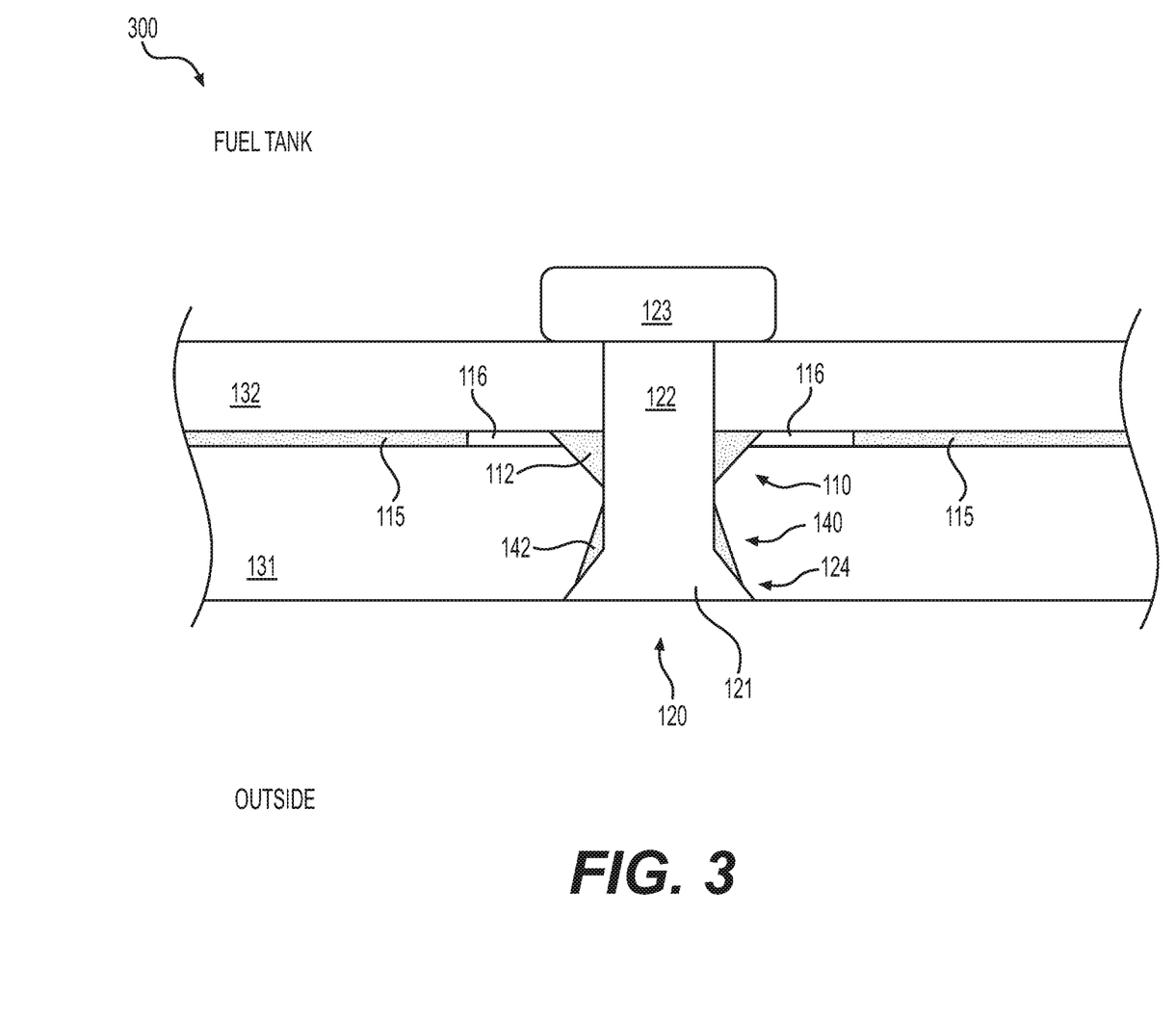
FIG. 3 is a cross-sectional side view of another embodiment of an aircraft-wing fuel-tank fastener installation having an integral sealant O-ring.

FIG. 1 is a cross-sectional side view of a prior art aircraft-wing fuel-tank fastener installation 100. Dimensions in the figures are not drawn to scale. Mating surfaces of an aircraft wing structure often include a first surface fastened to a second surface. For example, as depicted in FIGS. 1-3, the first surface is an outer surface 131 and the second surface is an inner surface 132. Outer and inner surfaces 131, 132 may be made of sheet metal, for example, and are aligned substantially parallel with one another in a transverse direction. Outer surface 131 has an inner side adjacent inner surface 132 and an outer side opposite the inner side. Inner surface 132 has an inner side that is exposed to fuel within a bladderless fuel tank and an outer side adjacent outer surface 131. Outer surface 131 may be an outer wing surface with its outer side exposed to air outside of the aircraft. The interface between the inner side of outer surface 131 and outer side of the inner surface 132 is known as a "fay interface".

A fastener 120 is used to pull outer surface 131 and inner surface 132 together along the fay interface such that the inner side of outer surface 131 mates flush with the outer side of inner surface 132. In practice, a plurality of fasteners are used to pull the mating surfaces together; however, only one fastener is described and depicted in the figures for clarity of illustration. Fastener 120 is for example a rivet or HI-LOK™ pin (Lisi Aerospace, Paris, France). A shank portion 122 of fastener 120 passes through aligned holes of the mating surfaces in a longitudinal direction, substantially perpendicular to the transverse direction. Specifically, a first hole is drilled through outer surface 131 and a second hole is drilled in a matching location through inner surface 132.

A sealant 115 is placed along the fay interface, between outer surface 131 and inner surface 132, prior to pulling the surfaces together. An example of sealant 115 is 3M™ Aerospace Sealant AC-350 (3M, Maplewood, Minn.). Sealant 115 forms a fay seal intended to prevent fuel from seeping along the fay interface and contacting shank portion 122, where it may seep along shank portion 122 and leak outside. The problem with fay seals is that they are not completely reliable because sealant 115 is pressed away from shank portion 122 as the mating surfaces (e.g., outer and inner surfaces 131, 132) are pulled together leaving a gap 116 having little or no sealant directly around shank portion 122. Gap 116 lacking sealant provides a potential path for fuel to leak along shank portion 122, especially if there is a flaw in one of the mating surfaces along the fay interface.

A fillet seal may be applied around the edge of a head portion 123 of fastener 120, but application of a fillet seal is laborious. In practice, a daub seal 117 is applied to head portion 123 of fastener 120, as depicted in FIG. 1. To improve task efficiency, excess sealant is applied to daub seal 117, which may result in up to approximately seventy-five percent of the sealant applied being unnecessary. Therefore, daub seal 117 adds weight to the aircraft (in the form of excess sealant) and also requires labor in addition to applying a fay seal.

Embodiments of the present disclosure provide a chamfer for receiving sealant around a fastener, which forms an integral sealant O-ring around a shank portion of the fastener adjacent a fay interface. Advantages include improved prevention of fuel leakage from a wet wing aircraft while eliminating the need for a daub seal applied to the fastener.

FIG. 2 is a cross-sectional side view of an exemplary aircraft-wing fuel-tank fastener installation 200. Mating surfaces of the aircraft-wing structure are the same as FIG. 1, namely outer surface 131 and inner surface 132. In certain embodiments, outer surface 131 is an outer wing surface with its outer side exposed to air outside of the aircraft.

As depicted in FIG. 2, an exemplary fastener 120 is a countersunk bolt having a tapered end 121 flush with the outer side of outer surface 131. Shank portion 122 of fastener 120 passes through a first hole of outer surface 132 and a second hole of inner surface 132, and head portion 123 is adjacent the inner side of inner surface 132. Head portion 123 is for example a rivet head or a threaded nut for tightening along corresponding threads of shank portion 122. Once tightened, outer surface 131 and inner surface 132 squeeze sealant away from shank portion 122 forming gap 116, as further described below in connection with FIG. 4. Head portion 123 is also referred to as the wet end of fastener 120 since it gets wet from fuel when fuel is present in the fuel tank. An improperly sealed fastener 120 is susceptible to wicking or seeping of fuel along and under head portion 123 and along shank portion 122 to the outer side of outer surface 131.

As depicted in FIG. 2, a chamfer 110 is provided along the fay interface and around the fastener hole in outer surface 131. However, chamfer 110 may be provided along the fay interface in either outer surface 131 or inner surface 132 as further described below in connection with step 610, FIG. 6.

Sealant 115 is applied to the fay interface as further described below in connection with step 620, FIG. 6. Sealant 115 fills chamfer 110 such that sealant 115 forms a ring around shank portion 122. Outer surface 131 and inner surface 132 are pulled together via fastener 120, as further described below in connection with step 650, FIG. 6. A portion of the sealant remains trapped around in chamfer 110 despite sealant being squeezed away from shank portion 122 along the fay interface forming gap 116. In other words, integral sealant O-ring 112 is an O-ring made of sealant 115 that is integrally formed around shank portion 122 in chamfer 110 along the fay interface of the mating surfaces, as depicted in FIG. 2. The resulting integral sealant O-ring 112 obviates the need for performing a secondary operation of applying daub seal 117 to head portion 123, as depicted in FIG. 1.

Chamfer 110 is formed in a fay surface around a fastener hole as part of the process of drilling the fastener hole. Exemplary drilling processes used to form chamfer 110 are described below in connection with step 610, FIG. 6. Fastener 120 is preferably cleaned prior to installation in outer and inner surfaces 131, 132 to avoid contamination, which may inhibit sealant 115 from adhering to shank portion 122, as further described below in connection with step 640, FIG. 6.

As depicted in FIG. 2, chamfer 110 forms a maximum width "A" around shank portion 122 and a maximum depth "C" into outer surface 131, where outer surface 131 has a thickness "D". The diameter of head portion 123 is such that it overlaps shank portion 122 in a radial direction by a distance "B". In certain embodiments, width A of chamfer 110 is less than or equal to half of distance B, and depth C is less than or equal to half of thickness D. A cone angle of chamfer 110 may be within the range of fifteen to sixty degrees and preferably about forty-five degrees with respect to the longitudinal direction of the shank portion. Chamfer 110 may have straight or curved walls without departing from the scope hereof.

FIG. 3 is a cross-sectional side view of an exemplary aircraft-wing fuel-tank fastener installation 300. Fastener installation 300 is an example of fastener installation 200, FIG. 2 having an additional integral sealant O-ring 142 formed around a portion of fastener 120. Specifically, integral sealant O-ring 142 is formed around part of shank portion 122 adjacent tapered end 121 and around a portion of tapered end 121. Integral sealant O-ring 142 may be used in place of integral sealant O-ring 112 or in combination with integral sealant O-ring 112 as depicted in FIG. 3.

Integral sealant O-ring 142 may be formed by adding a narrow chamfer 140 to a wide chamfer 124. Wide chamfer 124 is adapted for accepting tapered end 121 of fastener 120. Narrow chamfer 140 may be added by drilling with a countersink drill as described below in connection with optional step 615, FIG. 6. Narrow chamfer 140 provides a radial channel around shank portion 122 above tapered end 121. As described below in connection with optional step 625, the radial channel may be filled with sealant prior to insertion of fastener 120 such that an integral sealant O-ring 142 is formed in the radial channel for preventing fuel seepage from the fuel tank along fastener 120 to the outside.

Figure 4:
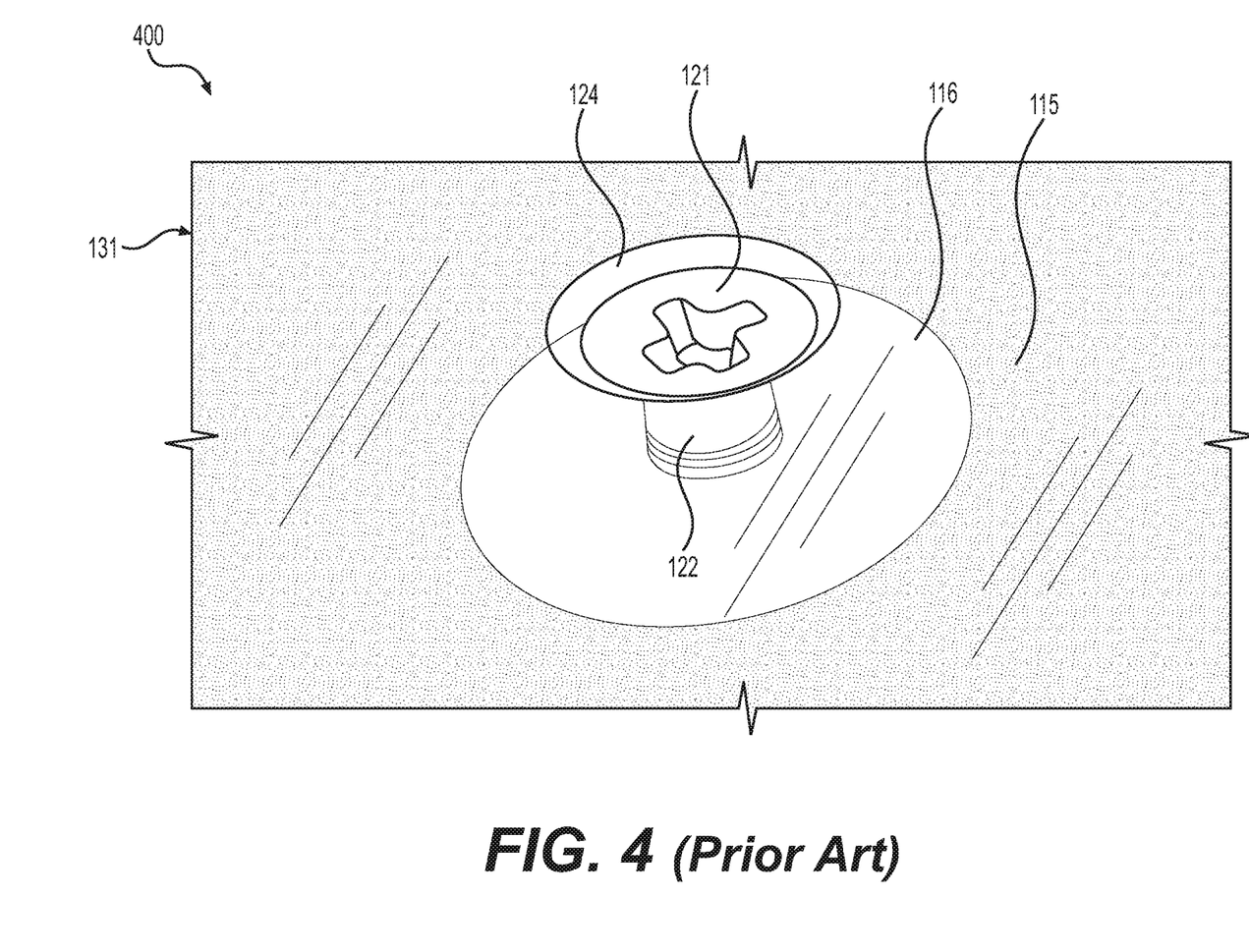
FIG. 4 is a perspective view of a prior art aircraft-wing fuel-tank fastener installation.
Figure 5:
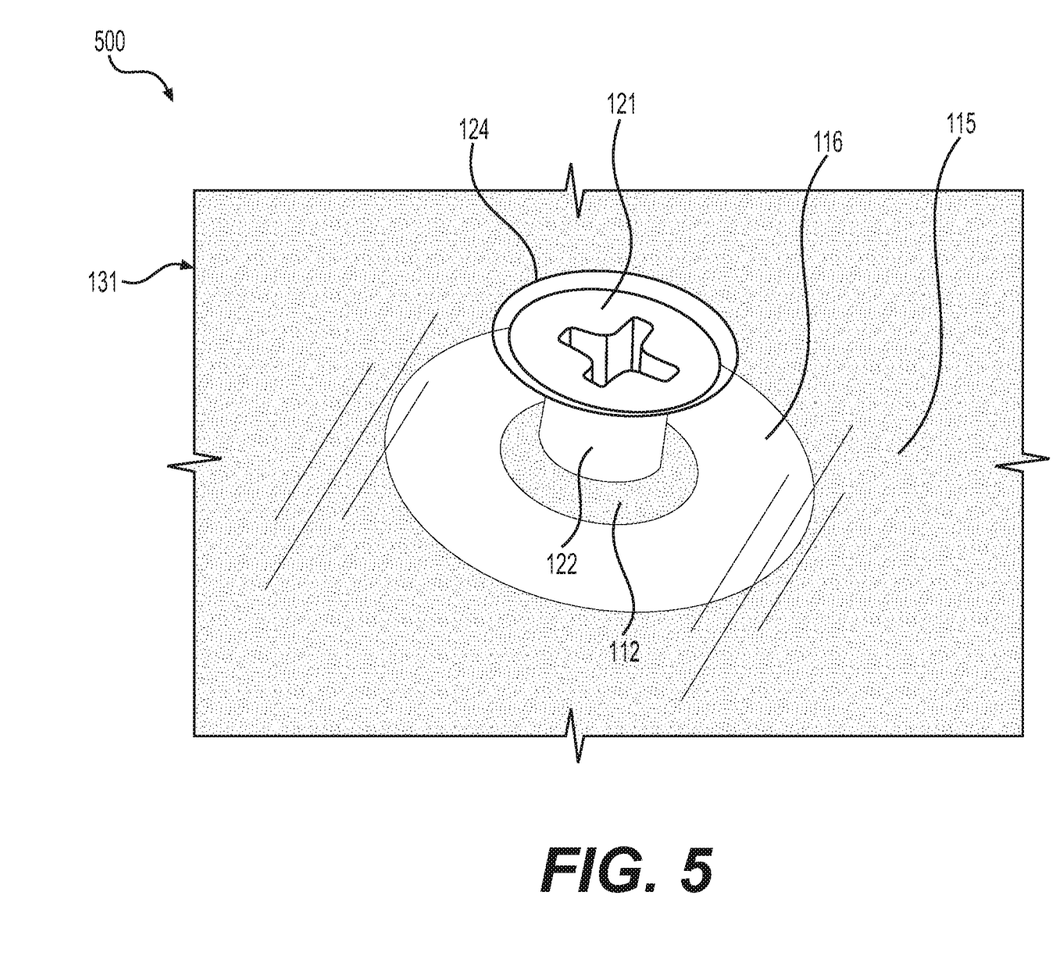
FIG. 5 is a perspective view of an exemplary aircraft-wing fuel-tank fastener installation having an integral sealant O-ring, in an embodiment.

FIG. 4 is a perspective view of a prior art aircraft-wing fuel-tank fastener installation 400. In FIGS. 4 and 5, outer surface 131 is depicted as a transparent material (e.g., an acrylic block) for demonstration purposes only such that sealant 115 may be viewed along the fay interface with inner surface 132. Shaft 122 is visible through the transparent outer surface 131.

In the prior art installation 400, a gap 116 in sealant 115 forms around shank portion 122 upon tightening of the fastener. In other words, as outer surface 131 and inner surface 132 are squeezed tightly together, sealant 115 is compressed near the fastener. Since the portions of the mating surfaces closest to the fastener are squeezed together the tightest by the fastener, the area immediately surrounding the fastener tends to be evacuated of sealant 115 forming gap 116. Gap 116 leaves an unsealed area around shank portion 122 providing a potential path for fuel to leak along the fastener from inside the fuel tank.

FIG. 5 is a perspective view an exemplary aircraft-wing fuel-tank fastener installation 500 having an integral sealant O-ring 112. The O-ring 112 is formed of sealant that fills in a chamfer around shank portion 122 at the fay interface. The chamfer may be added to either the inner surface 132 or the outer surface 131. After applying sealant along the fay interface, the fastener is tightened, and sealant 115 remains trapped in the chamfer such that gap 116 is separated from the shank portion 122 by the integral sealant O-ring 112. In this manner, the fastener is sealed preventing fuel from leaking along the fastener.

Figure 6:
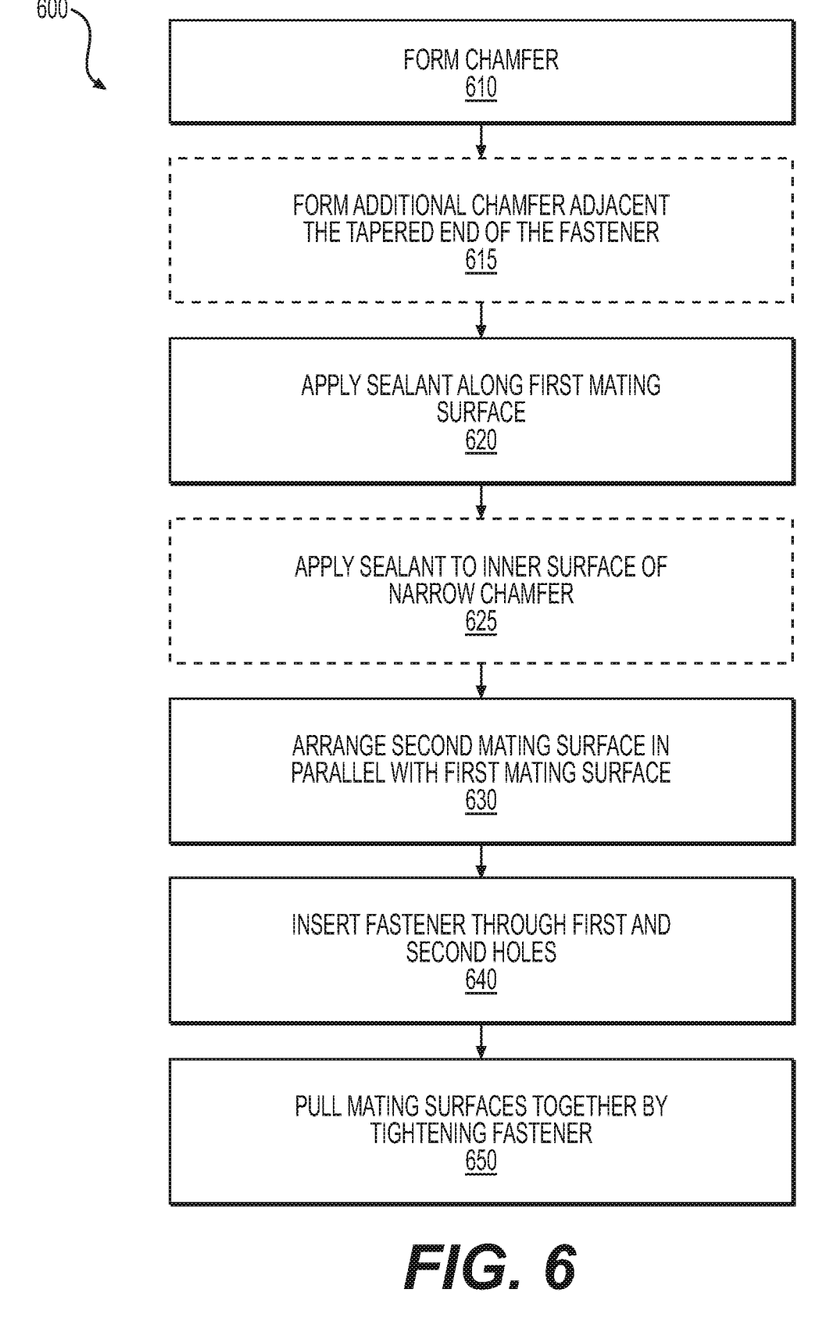
FIG. 6 is a block diagram showing steps of a method for forming an integral sealant O-ring for sealing fasteners of mating surfaces of a fuel tank, in an embodiment.

FIG. 6 is a block diagram showing steps of a method 600 for forming an integral sealant O-ring for sealing fasteners of mating surfaces of a fuel tank. The method may be used during manufacture to install fastener installation 200, FIG. 2. Optional steps of the method may be used to install fastener installation 300, FIG. 3, as described below.

In a step 610, a chamfer is formed in a first mating surface. The chamfer is formed substantially concentric with a first hole through the first mating surface adapted for receiving a fastener. For example, after the first hole is drilled with a standard drill bit, the chamfer is drilled into an outer portion of the first hole using a countersink drill bit. Alternatively, the hole and chamfer may both be drilled in one pass using an all-in-one type of countersink drill bit. Drilling of the first hole and the chamfer are preferably performed without lubrication (e.g., without BOELUBE®) to provide a clean surface for sealant adhesion. In an example of step 610, chamfer 110 is formed in outer surface 131 along the fay interface, as depicted in FIG. 2. In some embodiments, chamfer 110 is instead formed in inner surface 132 (not shown). In other words, integral sealant O-ring 112 may be formed along the fay interface in either outer surface 131 or inner surface 132 without departing from the scope hereof.

In an optional step 615, an additional integral sealant O-ring may be formed around the shank portion of the fastener adjacent the tapered end. In an example of optional step 615, additional integral sealant O-ring 142 is formed around shank portion 122 adjacent tapered end 121, as depicted in FIG. 3 and described above. Narrow chamfer 140 may be added by drilling with a countersink drill bit having a narrower cone angle compared to that used to form wide chamfer 124. For example, wide chamfer 124 may have a cone angle of about forty-five degrees and narrow chamfer 140 may have a cone angle of about thirty degrees with respect to shank portion 122. However, narrow chamfer 140 may be formed with any cone angle narrower than wide chamfer 124 so long as the bearing area of fastener 120 (i.e., the unchamfered portion of the fastener hole around shank portion 122) is reduced by less than fifty percent, including the reduction of the bearing area of fastener 120 due to chamfer 110. When a fastener is inserted in step 640, narrow chamfer 140 provides a radial channel around a portion of tapered end 121 and around shank portion 122 adjacent tapered end 121.

In a step 620, sealant is applied along a first mating surface. In an example of step 620, sealant 115 is disposed along the fay interface prior to pulling the first mating surface together with a second mating surface. In certain embodiments, sealant may be applied to either or both of the first and second mating surfaces. An example of sealant 115 is 3M™ Aerospace Sealant AC-350 (3M, Maplewood, Minn.). Sealant 115 forms a fay seal intended to prevent fuel from seeping along the fay interface.

In an optional step 625, sealant is applied to an inner surface of a narrow chamfer prior to insertion of the fastener to form an integral sealant O-ring. In an example of optional step 625, sealant is applied along the inside of narrow chamfer 140 prior to insertion of fastener 120.

In a step 630, a second mating surface is arranged substantially parallel with the first mating surface, and a second hole through the second mating surface is aligned with the first hole through the first mating surface. In an example of step 630, outer surface 131 is arranged substantially parallel with inner surface 132, and the first hole through outer surface 131 is aligned with the second hole through inner surface 132.

In a step 640, a fastener is inserted through the first hole and the second hole. In an example of step 640, fastener 120 is inserted through the first hole of outer surface 131 and the second hole of inner surface 132. In certain embodiments, the fastener is cleaned prior to inserting through the fastener holes to ensure proper adhering of the sealant with the shank portion of the fastener. For example, a simple rotary cleaning station may be provided at a wing assembly station to enable cleaning of fasteners immediately prior to installation. Clean fasteners are preferably handled by a gloved operator (e.g., wearing white cotton gloves commonly used in manufacturing operations) to prevent contamination during installation. In embodiments having a narrow chamfer 140, an additional integral sealant O-ring 142 is formed in a radial channel around shank portion 122 at tapered end 121 to prevent fuel seepage from the fuel tank along shank portion 122 to the outside.

In a step 650, first and second mating surfaces are pulled together by tightening at least one fastener. In practice, a plurality of fasteners are used to pull the mating surfaces together; however, only one fastener is described and depicted in the figures for clarity of illustration. Tightening of the fastener(s) traps a portion of the sealant within the chamfer for forming an integral sealant O-ring around a shank portion of the fastener. In an example of step 650, outer surface 131 is pulled together with inner surface 132 by tightening fastener 120, which compresses the sealant layer trapped in chamfer 110 for forming integral sealant O-ring 112 around shank portion 122.

By using method 600, fuel leakage is prevented from a wet wing aircraft by forming the integral sealant O-ring along the shank portion of the fastener. Advantages include improved reliability, reduced labor associated with applying a fillet seal around the edge of a head portion of the fastener, and reduced labor and sealant associated with applying a daub seal to the head portion of the fastener.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A sealing assembly for sealing fasteners in mating surfaces of a fuel tank, comprising:
    an inner mating surface having an inner hole for receiving a fastener;
    an outer mating surface having an outer hole for receiving the fastener, the outer hole being aligned with the inner hole;
    the fastener having a shank portion aligned through the inner hole and the outer hole and a head portion protruding adjacent the inner mating surface for tightening the fastener;
    a first chamfer in an outer side of the outer mating surface adapted for receiving a tapered end of the fastener;
    a second chamfer in an inner side of the outer mating surface, the second chamfer being around the inner hole and along a fay interface between the inner mating surface and the outer mating surface;
    a layer of sealant applied along the fay interface; and
    an integral sealant O-ring formed in the second chamfer by the layer of sealant upon tightening of the fastener.

2. The sealing assembly of claim 1, wherein a width of the second chamfer is less than or equal to half of a distance that the head portion overlaps the shank portion.

3. The sealing assembly of claim 1, wherein a depth of the second chamfer is less than or equal to half of a thickness of the inner mating surface.

4. The sealing assembly of claim 1, wherein a cone angle of the second chamfer is between about fifteen degrees to about sixty degrees with respect to a longitudinal direction of the shank portion.

5. The sealing assembly of claim 1, wherein the integral sealant O-ring prevents fuel leakage from a wet wing aircraft along the shank portion of the fastener without a daub seal applied to the head portion of the fastener.

6. An aircraft sealing assembly for sealing fasteners in mating surfaces of a fuel tank, comprising:
    an inner mating surface having an inner hole for receiving a fastener;
    an outer mating surface having an outer hole for receiving the fastener, the outer hole being aligned with the inner hole;
    the fastener having a shank portion aligned through the inner hole and the outer hole and a head portion protruding adjacent the inner mating surface for tightening the fastener;
    a first chamfer in the outer mating surface adapted for receiving a tapered end of the fastener;
    a second chamfer, concentric with the first chamfer, the second chamfer having a narrower cone angle than that of the first chamfer such that a radial channel is formed around a portion of the shank and a portion of the tapered end; and
    a layer of sealant applied along the second chamfer such that an integral sealant O-ring is formed in the radial channel.

7. The aircraft sealing assembly of claim 6, wherein a cone angle of the first chamfer has a wider cone angle than the second chamfer.

8. The aircraft sealing assembly of claim 7, wherein a cone angle of the first chamfer is about forty-five degrees and a cone angle of the second chamfer is about thirty degrees.

9. The aircraft sealing assembly of claim 6, wherein a bearing area of the fastener 120 is reduced by less than fifty percent due to the second chamfer.

10. The aircraft sealing assembly of claim 6, wherein the integral sealant O-ring prevents fuel leakage from a wet wing aircraft along the shank portion of the fastener without a daub seal applied to the head portion of the fastener.

11. The aircraft sealing assembly of claim 6, further comprising a third chamfer in one of the inner mating surface or the outer mating surface along a fay interface therebetween, wherein sealant applied along the fay interface forms an additional integral sealant O-ring in the third chamfer upon tightening of the fastener.

12. A sealing assembly for sealing fasteners in mating surfaces of an aircraft fuel tank, comprising:
    an inner mating surface having an inner hole for receiving a fastener;
    an outer mating surface having an outer hole for receiving the fastener, the outer hole being aligned with the inner hole;
    the fastener having a shank portion aligned through the inner hole and the outer hole and a head portion protruding adjacent the inner mating surface for tightening the fastener;
    a first chamfer in an outer side of the outer mating surface adapted for receiving a tapered end of the fastener;
    a second chamfer in an inner side of the outer mating surface, the second chamfer being around the outer hole and along a fay interface between the inner mating surface and the outer mating surface;
    a third chamfer in the outer side of the outer mating surface, concentric with the first chamfer, the third chamfer having a narrower cone angle than that of the first chamfer such that a radial channel is formed around a portion of the shank and a portion of the tapered end;
    a layer of sealant applied along the fay interface; and
    an integral sealant O-ring formed in the second chamfer and the third chamfer by the layer of sealant upon tightening of the fastener.

13. The sealing assembly of claim 12, wherein a width of the second chamfer is less than or equal to half of a distance that the head portion overlaps the shank portion.

14. The sealing assembly of claim 12, wherein a depth of the second chamfer is less than or equal to half of a thickness of the outer mating surface.

15. The sealing assembly of claim 12, wherein a cone angle of the second chamfer is between about fifteen degrees to about sixty degrees with respect to a longitudinal direction of the shank portion.

16. The sealing assembly of claim 12, wherein the integral sealant O-ring prevents fuel leakage from a wet wing aircraft along the shank portion of the fastener without a daub seal applied to the head portion of the fastener.

* * * * *